United States Patent
Saito et al.

(10) Patent No.: US 8,991,995 B2
(45) Date of Patent: Mar. 31, 2015

(54) ACTIVE-ENERGY-RAY-CURABLE INKJET RECORDING INK COMPOSITION AND METHOD FOR FORMING IMAGE

(75) Inventors: Naohito Saito, Kita-adachi-gun (JP); Yutaka Yamada, Kita-adachi-gun (JP); Maiko Kitade, Kita-adachi-gun (JP)

(73) Assignee: DIC Corporation, Tokyo (JP)

( * ) Notice: Subject to any disclaimer, the term of this patent is extended or adjusted under 35 U.S.C. 154(b) by 0 days.

(21) Appl. No.: 14/114,148

(22) PCT Filed: May 30, 2012

(86) PCT No.: PCT/JP2012/063866
§ 371 (c)(1),
(2), (4) Date: Feb. 14, 2014

(87) PCT Pub. No.: WO2012/172974
PCT Pub. Date: Dec. 20, 2012

(65) Prior Publication Data
US 2014/0160215 A1 Jun. 12, 2014

(30) Foreign Application Priority Data
Jun. 16, 2011 (JP) ................................. 2011-134121

(51) Int. Cl.
| | |
|---|---|
| C09D 11/18 | (2006.01) |
| C09D 11/30 | (2014.01) |
| C09D 11/101 | (2014.01) |
| C09D 11/322 | (2014.01) |
| B41M 5/00 | (2006.01) |
| B41M 7/00 | (2006.01) |
| B41J 11/00 | (2006.01) |

(52) U.S. Cl.
CPC .............. *C09D 11/30* (2013.01); *C09D 11/101* (2013.01); *C09D 11/322* (2013.01); *B41M 5/0047* (2013.01); *B41M 5/0064* (2013.01); *B41M 7/0081* (2013.01); *B41J 11/002* (2013.01)
USPC ....................................... 347/100; 106/31.25

(58) Field of Classification Search
USPC .......................................................... 347/100
See application file for complete search history.

(56) References Cited

U.S. PATENT DOCUMENTS

| | | | |
|---|---|---|---|
| 2006/0170745 A1* | 8/2006 | Deroover et al. .............. | 347/100 |
| 2008/0166495 A1* | 7/2008 | Maeno et al. .................. | 427/493 |

FOREIGN PATENT DOCUMENTS

| | | | | |
|---|---|---|---|---|
| JP | 2004-067991 A | | 3/2004 | |
| JP | 2008-195882 A | | 8/2008 | |
| JP | 2008195882 A | * | 8/2008 | ............. C09D 11/00 |
| JP | 2009-040880 A | | 2/2009 | |
| JP | 2009-057548 A | | 3/2009 | |
| JP | 2010-215799 A | | 9/2010 | |
| JP | 2010-235914 A | | 10/2010 | |
| JP | 2012-111848 A | | 6/2012 | |

OTHER PUBLICATIONS

International Search Report for PCT/JP2012/063866, Mailing Date of Aug. 21, 2012.

* cited by examiner

*Primary Examiner* — Lamson Nguyen
(74) *Attorney, Agent, or Firm* — Westerman, Hattori, Daniels & Adrian, LLP

(57) ABSTRACT

An active-energy-ray-curable inkjet recording ink composition is provided, in which a polymerizable compound having an active-energy-ray-polymerizable group and a polymerizable compound having at least two active-energy-ray-polymerizable groups are used in amounts of 60 to 95 mass % and 5 to 40 mass % relative to the total amount of the active-energy-ray-polymerizable compound, respectively; the polymerizable compound having an active-energy-ray-polymerizable group includes N-vinyl-2-caprolactam and isobornyl acrylate in amounts of 1 to 15 mass % and 1 to 25 mass % relative to the total amount of the active-energy-ray-polymerizable compound, respectively; and the polymerizable compound having at least two active-energy-ray-polymerizable groups includes a polymerizable compound having a vinyl ether group. Furthermore, a method for forming an image is provided.

5 Claims, No Drawings

US 8,991,995 B2

ACTIVE-ENERGY-RAY-CURABLE INKJET RECORDING INK COMPOSITION AND METHOD FOR FORMING IMAGE

TECHNICAL FIELD

The present invention relates to an active-energy-ray-curable inkjet recording ink composition which can be well cured even with a light-emitting diode (LED) as a light source and which has good adhesive properties and solvent resistance.

BACKGROUND ART

In printing with a recording apparatus used for inkjet printing, ink is elected from nozzles and then adheres to a recording medium. Since the nozzles are positioned away from a recording medium, printing can be carried out on surfaces having irregular shapes, such as a curved surface and an uneven surface, in a good manner. Hence, such printing has been expected to be widely used in industrial Applications.

In general, inks used in such inkjet recording include aqueous dye inks containing water as the prime solvent and non-aqueous (oil-based) dye inks containing organic solvents as the prime solvent. Typical aqueous dye inks have, however, problems when they are used for industrial purposes, such as an insufficient drying rate of a printed film formed on materials which are less likely to absorb liquid, e.g., plastic films; insufficient adhesive properties (adhesion) of a printed film; and insufficient durability, e.g., abrasion resistance, water resistance, and light fastness. On the other hand, oil-based dye inks contain chromium complex dyes composed of heavy metals such as chromium and therefore have problems in terms of safety.

In order to overcome such problems related to colorants, various inks have been proposed, such as aqueous pigment inks and oil-based pigment inks which contain pigments as colorants, and active-energy-ray-curable inkjet recording inks which are substantially free from non-polymerizable solvents such as organic solvents used for, for example, dilution and dissolution and which can be irradiated with an active energy ray such as ultraviolet light, to cure and dry a printed film.

In the case of using active-energy-ray-curable inkjet recording inks, since a printed film is irradiated with an active energy ray for curing, relatively high durability can be imparted to the printed film. There has been, however, a problem in which adhesion is insufficient in printing on materials which are less likely to absorb liquid, e.g., plastic films. Although a variety of oligomers and adhesive resins may be effectively added to enhance the adhesion, this approach leads to an increase in the viscosity of the ink, which forces printing heads to be driven under limited conditions for stable ink ejection. In particular, in the case where the size of ink droplets is reduced, ejection of small droplets of a highly viscous ink causes problems such as an increase in the number of satellite droplets; a reduction in the precision of landing of ink, e.g., ejection in an unintended direction; and nozzle clogging. Addition of reactive monomers such as tetrahydrofurfuryl acrylate and cyclohexyl acrylate is another effective approach to enhance adhesion; however, such an approach causes problems in terms of VOC, odor, or skin irritation in some cases.

An active-energy-ray-curable inkjet ink composition (for instance, see Patent Literature, 1) has been disclosed as an technique for enhancing adhesion; the ink composition contains polymerizable monofunctional monomers in an amount of 60% to 98% relative to the total amount of polymerizable monomers, one of the monofunctional monomers is isobornyl acrylate, the isobornyl acrylate content is from 75% to 65% relative to the total amount of the polymerizable monomers, one of the monofunctional monomers is N-vinylcaprolactam, and the N-vinylcaprolactam content is from 12.5% to 60% relative to the total amount of the polymerizable monomers.

Use of a light-emitting diode lamp (hereinafter referred to as "LED lamp") having a low energy has become popular as a light source used for active-energy-ray-curable inkjet recording inks in place of typical light sources such as a metal halide lamp and a high-pressure mercury lamp. A light-emitting diode UV-LED which is an example of LED lamps emits ultraviolet light having the peak emission wavelength ranging from 350 to 420 nm. In the case where the UV-LED is used for inks suitable for traditional light sources such as a metal halide, lamp and a high-pressure mercury lamp, a photopolymerization initiator which can absorb light having a wavelength of around 350 to 420 nm needs to be used; however, since a pigment itself contained in the ink can absorb light having a wavelength ranging from 350 to 420 nm, even use of the photopolymerization initiator which can absorb light having a wavelength of 350 to 420 nm eventually leads to a problem of insufficient curing in many cases. Thus, in an attempt to cure the ink disclosed in Patent Literature 1 with an LED lamp, durability, particularly solvent resistance, cannot be imparted to a printed film in some cases.

CITATION LIST

Patent Literature

PTL 1: Japanese Unexamined Patent Application. Publication No-2010-235914

SUMMARY OF INVENTION

Technical Problem

It is an object of the present invention to provide an active-energy-ray-curable inkjet recording ink composition which can be well cured even with an LED lamp as a light source and which has good adhesive properties and solvent resistance.

Solution to Problem

The inventors have found an active-energy-ray-curable inkjet recording ink composition which satisfies the following requirements (1) to (3) can be well cured even with an LED lamp and has excellent adhesive properties and solvent resistance:

(1) a polymerizable compound having an active-energy-ray-polymerizable group and a polymerizable compound having at least two active-energy-ray-polymerizable groups are used in amounts of 60 to 95 mass % and 5 to 40 mass % relative to the total amount of the active-energy-ray-polymerizable compound, respectively, (2) the polymerizable compound having an active-energy-ray-polymerizable group includes N-vinyl-2-caprolactam and isobornyl acrylate in amounts of 1 to 15 mass % and 1 to 25 mass % relative to the total amount of the active-energy-ray-polymerizable compound, respectively, and (3) the polymerizable compound having at least two active-energy-ray-polymerizable groups includes a polyfunctional polymerizable compound having a vinyl ether group.

(1) The amount of the polymerizable compound having an active-energy-ray-polymerizable group (hereinafter referred to as "monofunctional monomer") is 60 to 95 mass % relative to the total amount of the active-energy-ray-polymerizable compounds, and (2) the essential components thereof are 1 to 15 mass % of N-vinyl-2-caprolactam and 1 to 25 mass % of isobornyl acrylate, which enables formation of a printed film having an good adhesion even to recording media which are less likely to absorb liquid. In addition, (3) a polymerizable compound having a vinyl ether group is used as the polymerizable compound having at least two active-energy-ray-polymerizable groups (hereinafter referred to as "polyfunctional monomer"), which enables a good balance between adhesion and crosslink density; hence, a printed film particularly exhibiting good solvent resistance can be formed.

In particular, an aspect of the present invention provides an active-energy-ray-curable inkjet recording ink composition containing an active-energy-ray-polymerizable compound and a photopolymerization initiator, wherein (1) a polymerizable compound having an active-energy-ray-polymerizable group and a polymerizable compound having at least two active-energy-ray-polymerizable groups are used in amounts of 60 to 95 mass % and 5 to 40 mass % relative to the total amount of the active-energy-ray-polymerizable compound, respectively;

(2) the polymerizable compound having an active-energy-ray-polymerizable group includes N-vinyl 2-caprolactam and isobornyl acrylate in amounts of 1 to 15 mass % and 1 to 25 mass % relative to the total amount of the active-energy-ray-polymerizable compound, respectively; and (3) the polymerizable compound having at least two active-energy-ray-polymerizable groups includes a polymerizable compound having a vinyl ether group.

Another aspect of the present invention provides a method for forming an image, the method including ejecting an active-energy-ray-curable inkjet recording ink composition to a recording medium to print an image and irradiating the image with an active energy ray having the peak wavelength ranging from 365 to 420 nm with an LED lamp to cure the image, wherein the active-energy-ray-curable inkjet recording ink composition is the above-mentioned ink composition.

Advantageous Effects of Invention

An aspect of the present invention provides an active-energy-ray-curable inkjet recording ink composition which can be well cured even with an LED lamp as a light source and which has good adhesive properties and solvent resistance.

DESCRIPTION OF EMBODIMENTS

Active-Energy-Ray-Polymerizable Compound

An active-energy-ray-polymerizable compound used in the present invention has the following characteristics:

(1) a monofunctional monomer and a polyfunctional monomer are used in amounts of 60 to 95 mass % and 5 to 40 mass % relative to the total amount of the active-energy-ray-polymerizable compound, respectively;

(2) the monofunctional monomer includes N-vinyl-2-caprolactam and isobornyl acrylate in amounts of 1 to 15 mass % and 1 to 25 mass % relative to the total amount of the active-energy-ray-polymerizable compound, respectively; and (3) the polyfunctional monomer includes a polymerizable compound having a vinyl ether group.

N-vinyl-2-caprolactam particularly contributes to good adhesion to plastic materials. Hence, at the N-vinyl-2-caprolactam content less than 1 mass %, the adhesion is insufficient. At the N-vinyl-2-caprolactam content greater than 15 mass %, the ink itself is likely to have insufficient storage stability.

Isobornyl acrylate contributes to formation of a printed film having an excellent solvent resistance in the range of the above-mentioned content. At the isobornyl acrylate content of less than 1 mass % or greater than 25 mass %, the solvent resistance is likely to be insufficient.

The polymerizable compound having a vinyl ether group, which is the polyfunctional monomer, particularly contributes to good adhesion to plastic materials. Any polyfunctional monomer having at least one vinyl ether group can be used as the polymerizable compound having a vinyl ether group; examples thereof include vinyl ether compounds having at least two vinyl ether groups and compounds having both a vinyl ether group and a (meth)acryloyl group. Specific examples of such compounds include di- or tri-vinyl ether compounds such as 2-(2-vinyloxyethoxy)ethyl(meth)acrylate, ethylene glycol divinyl ether, diethylene glycol divinyl ether, triethylene glycol divinyl ether, propyleneglycol divinyl ether, dipropyleneglycol divinyl ether, butanediol divinyl ether, hexanediol divinyl ether, cyclohexanedimethanoldivinyl ether, and trimethylolpropane trivinyl ether. Among these, 2-(2-vinyloxyethoxy)ethyl(meth)acrylate is most preferred in terms of adhesion.

In the present invention, any known monofunctional monomer can be used as monofunctional monomers other than N-vinyl-2-caprolactam and isobornyl acrylate. Examples of the monofunctional monomers include (meth)acrylate, vinylpyrrolidone, and N-vinylformamide having substituents such as methyl, ethyl, propyl, butyl, amyl, 2-ethylhexyl, isooctyl, nonyl, dodecyl, hexadecyl, octadecyl, cyclohexyl, benzyl, methoxyethyl, butoxyethyl, phenoxyethyl, nonylphenoxyethyl, glycidyl, dimethylaminoethyl, diethylaminoethyl, dicyclopentanyl, dicyclopentenyl, and dicyclopentenyloxyethyl.

These materials may be used in combination.

In the present invention, any known polyfunctional monomer can be used as polyfunctional monomers other than the polymerizable compound having a vinyl ether group, and (meth)acrylates are preferably employed in view of reactivity by irradiation with an active energy ray. Examples of the polyfunctional (meth)acrylates include di(meth)acrylates such as 1,3-butylene glycol, 1,4-butanediol, 1,5-pentanediol, 3-methyl-1,5-pentanediol, 1,6-hexanediol, neopentyl glycol, 1,8-octanediol, 1,9-nonanediol, tricyclodecane dimethanol, ethylene glycol, polyethylene glycol, propylene glycol, dipropylene glycol, tripropylene glycol, and polypropylene glycol; di(meth)acrylates of tris(2-hydroxyethyl)isocyanurate; di(meth)acrylates of diols produced by adding 4 moles or more of ethylene oxide or propylene oxide to 1 mole of neopentyl glycol; di(meth)acrylates of diols produced by adding 2 moles of ethylene oxide or propylene oxide to 1 mole of bisphenol A; di- or tri-(meth)acrylates of triols produced by adding 3 moles or more of ethylene oxide or propylene oxide to 1 mole of trimethylolpropane; di(meth)acrylates of diols produced by adding 4 moles or more of ethylene oxide or propylene oxide to 1 mole of bisphenol A; trimethylolpropane tri(meth)acrylate; pentaerythritol tri(meth)acrylate; dipentaerythritol poly(meth)acrylate; ethylene oxide-modified phosphoric acid(meth)acrylate; and ethylene oxide-modified alkylated phosphoric acid(meth)acrylate. These materials may be used in combination.

In the present invention, reactive oligomers having a high molecular weight, such as a (meth)acrylate oligomer, may be used in a small amount to enhance crosslink density provided that the effects of the present invention are not impaired.

Examples of the reactive oligomers include a urethane (meth)acrylate oligomer, an epoxy(meth)acrylate oligomer, and a polyester(meth)acrylate oligomer. These oligomers may be used in combination.

Depending on types of an inkjet apparatus to be used, the active-energy-ray-polymerizable compound is preferably prepared such that the viscosity is approximately in the range of 1 to 100 mPa·sec after the monomers are mixed.

(Photopolymerization Initiator)

In the case where ultraviolet light is used as an active energy ray in the present invention, a photopolymerization initiator is preferably used. A radically polymerizable photopolymerization initiator is used as the photopolymerization initiator.

In particular, preferred examples thereof include, benzoin isobutyl ether, 2,4-diethylthioxanthone, 2-isopropylthioxanthone, benzyl, 2,4,6-trimethylbenzoyldiphenylphosphine oxide-6-trimethylbenzoyldiphenylphosphine oxide, 2-benzyl-2-dimethylamino-1-(4-morpholinophenyl)-butan-1-one, and bis(2,6-dimethoxybenzoyl)-2,4,4-phosphine oxide. Furthermore, other molecule-cleavage-type photopolymerization initiators may be used in combination with the above-described polymerization initiators, such as 1-hydroxycyclohexyl phenyl ketone, benzoinethyl ether, benzyl dimethyl ketal, 2-hydroxy-2-methyl-1-phenylpropan-1-one, 1-(4-isopropylphenyl)-2-hydroxy-2-methylpropan-1-one, and 2-methyl-1-(4-methylthiophenyl-2 morpholinopropan-1-one. Moreover, hydrogen-abstraction-type photopolymerization initiators, such as benzophenone, 4-phenylbezophenone, isophthalphenone, and 4-benzoyl-4'-methyl-diphenyl sulfide, may be additionally used.

In particular, in the case of using an LED, the photopolymerization initiator is preferably selected in consideration of the emission peak wavelength of the LED. Examples of the photopolymerization initiator suitable for the case in which a UV-LED is used include 2-benzyl-2-dimethylamino-1-(4-morpholinophenyl)-butan-1-one, 2-(dimethylamino)-2-[(4-methylphenyl)methyl]-1-(4-morpholinophenyl)-butan-1-one), bis(2,4,6-trimethylbenzoyl)phenylphosphine oxide, 2,4,6-trimethylbenzoyl-diphenyl-phosphine oxide, 2,4-diethylthioxanthone, and 2-isopropylthioxanthone.

A sensitizer may be used in combination with the above-mentioned photopolymerization initiator, and examples thereof include amines which do not induce the addition reaction with the above-mentioned polymerizable components, such as trimethylamine, methyldimethanolamine, triethanolamine, p-diethylaminoacetophenone, ethyl p-dimethylaminobenzoate, isoamyl p-dimethylaminobenzoate, N,N-dimethylbenzylamine, and 4,4'-bis(diethylamino)benzophenone.

In order to enhance the storage stability of an ink, the active-energy-ray-curable inkjet recording ink composition of the present invention may contain a polymerization inhibitor such as hydroquinone, methoquinone, di-t-butylhydroquinone, P-methoxyphenol, butylhydroxytoluene, and nitrosamine salts in an amount ranging from 0.01 to 2 mass % relative to the ink.

(Colorant)

The active-energy-ray-curable inkjet recording ink composition of the present invention can be applied to colorant-free inks such as varnish. A colorant, however, may be used on the basis of intended use. A colorant to be used may be a dye or a pigment; a pigment is preferably used in view of the durability of a printed article.

Examples of dyes usable in the present invention include a variety of dyes generally used in inkjet recording, such as direct dyes, acid dyes, food colors, basic dyes, reactive dyes, disperse dyes, vat dyes, soluble vat dyes, and reactive disperse dyes.

Examples of pigments usable in the present invention include inorganic pigments and organic pigments. Examples of the inorganic pigments include titanium oxide, iron oxide, and carbon blacks produced by known methods such as a contact method, a furnace method, and a thermal method. Examples of the organic pigments azo pigments (including azolake, insoluble azo pigments, condensed azo pigments, and chelate azo pigments), polycyclic pigments (e.g., phthalocyanine pigments, perylene pigments, perinone pigments, anthraquinone pigments, quinacridone pigments, dioxazine pigments, thioindigo pigments, isoindolinone pigments, and quinophthalone pigments), dye chelates (e.g., basic dye chelates and acid dye chelates), nitro pigments, nitroso pigments, and aniline black.

Specific Examples of the pigments include carbon blacks such as No. 2300, No. 900, MCF88, No. 33, No. 40, No. 45, No. 52, MA7, MA8, MA100, and No. 2200B (manufactured by Mitsubishi Chemical Corporation); Raven 5750, 5250, 5000, 3500, 1255, and 700 (manufactured by Columbian Chemicals Company); Regal 400R, 330R, and 660R, MoqulL and 700, and Monarch 800, 880, 900, 1000, 1100, 1300, and 1400 (manufactured by Cabot Corporation); and Color Black FW1, FW2, FW2V, FW18, and FW200, Color Black S150, S160, and S170, Printex35, U, V, and 140U, and Special Black 6, 5, 4A, and 4 (manufactured by Degussa AG).

Examples of pigments used for yellow inks include, C. I. Pigment Yellow 1, 2, 3, 12, 13, 14, 16, 17, 73, 74, 75, 83, 93, 95, 97, 90, 109, 110, 114, 120, 128, 129, 138, 150, 151, 154, 155, 180, 185, and 213.

Examples of pigments used for magenta inks include C. I. Pigment Red 5, 7, 12, 48 (Ca), 48 (Mn), 57 (Ca), 57:1, 112, 122, 123, 158, 184, 202, and 209; and C. I. Pigment Violet 19.

Examples of pigments used for cyan inks include C. I. Pigment Blue 1, 2, 3, 15:3, 15:4, 60, 16, and 22.

The average particle size of the pigment is in the range of preferably 10 to 200 nm, and more preferably approximately 50 to 150 nm. In order to develop sufficient image density and the light fastness of printed images, the colorant content is preferably in the range of 1 to 25 mass % relative to the total amount of the ink.

In the case where the active-energy-ray-curable inkjet recording ink composition contains a colorant, such a colorant-containing ink composition may be prepared so as to have a color variation for individual colors. For example, if four fundamental colors, namely, yellow, magenta, cyan, and black, are used in combination with deep and light colors thereof, the ink compositions of light magenta and red which are pale and deep magenta, respectively, are prepared in addition to the ink compositions of magenta; the in compositions of light cyan and blue which are pale and deep cyan, respectively, are prepared in addition to the ink composition of cyan; and the ink compositions of gray and light black and mat black which are pale and deep black, respectively, are prepared in addition to the ink composition of black.

In addition to the components described above, surfactants; leveling agents; matting agents; and materials used for adjusting physical properties of a film, such as polyester resins, polyurethane resins, vinyl resins, acrylic resins, rubber resins, and waxes can be optionally used provided that the effects of the present invention and election stability are not impaired.

A pigment dispersant is preferably used to enhance the dispersion stability of the pigment relative to, for example, the above-mentioned active-energy-ray-polymerizable compound. Specific examples thereof include, but are not limited to, AJISPER PB821, PB822, and PB817 manufactured by Ajinomoto Fine-Techno Co, Inc.; Solsperse 24000GR, 32000, 33000, and 39000 manufactured by Avecia; and DISPARLON DA-703-50, DA-705, and DA-725 manufactured by Kusumoto Chemicals, Ltd. The amount of the pigment dispersant is preferably in the range of 10 to 80 mass %, and especially preferably 20 to 60 mass % relative, to the pigment. At the amount less than 10 mass %, the dispersion stability is likely to be insufficient; at the amount greater than 80 mass %, the ink viscosity is likely to be increased with the result that election stability is readily reduced.

In order to, for instance, develop adhesion to a printing medium, the active-energy-ray-curable inkjet recording ink composition of the present invention may contain nonreactive resins such as an acrylic resin, an epoxy resin, a terpene phenol resin, and a rosin ester provided that the effects of the present invention are not impaired.

In the case where the active-energy-ray-curable inkier recording ink composition of the present invention contains a pigment, the active-energy-ray-curable inkjet recording ink composition can be produced by dispersing the pigment contained in a mixture of the pigment and an active-energy-ray-polymerizable compound and optionally a pigment dispersant and a resin with a common disperser such as a bead mill, adding a photopolymerization initiator to the resulting mixture, optionally adding an additive such as a regulator of surface tension thereto, and then stirring the product for dissolution. The active-energy-ray-curable inkjet recording ink composition can also be produced by preliminarily preparing a highly concentrated pigment dispersion liquid (millbase) with a common disperser such as a bead mill and mixing the pigment dispersion liquid with an active-energy-ray polymerizable compound in which a photopolymerization initiator has been dissolved, an additive, or another material under stirring.

A variety of known dispersers other than a bead mill can be employed as a stirrer-disperser used for dispersing the pigment, such as an ultrasonic homogenizer, a high-pressure homogenizer, a paint shaker, a ball mill, a roll mill, a sand mill, a sand grinder, a Dyno-Mill, a Dispermat, an SC MILL, and a NANOMIZER.

The active-energy-ray-curable inkjet recording ink composition of the present invention can be cured by being irradiated with light such as an active energy ray, preferably ultraviolet light. Examples of a light source of, for instance, ultraviolet light include light sources generally used for UV-curable inkjet inks, such as a metal halide lamp, a xenon lamp, a carbon arc lamp, a chemical lamp, a low-pressure mercury lamp, and a high-pressure mercury lamp, and the ink composition can be cured without any problem by use of these lamps. Examples of these lamps include commercially available products such as an H lamp, a D lamp, and a V lamp manufactured by Fusion Systems Co., Ltd.

The ink composition of the present invention is preferably cured by being irradiated with ultraviolet light emitted from such an ultraviolet light source at an integrated quantity of light of 50 to 1000 $mJ/cm^2$, and more preferably 50 to 200 $mJ/cm^2$.

The active-energy-ray-curable inkjet recording ink composition of the present invention is highly sensitive and can be therefore cured with ultraviolet-light-emitting semiconductor devices such as a UV-LED lamp and an ultraviolet light-emitting semiconductor laser. In particular, an image can be formed through a process of printing the image by ejecting the active-energy-ray-curable inkjet recording ink composition to a recording medium and a process of curing the image by irradiating the image with an active energy ray having the peak wavelength ranging from 365 to 420 nm with an LED lamp.

Any known inkjet recording technique can be used. Examples thereof include a technique in which the vibration of a piezoelectric device is utilized to eject liquid droplets (recording method involving use if an inkjet head used for forming ink droplets by mechanical deformation of an electrostrictive device) and a technique in which thermal energy is utilized.

In the inkjet recording method of the present invention, a photocurable ink composition to be used exhibits low (low skin irritation) and low viscosity and is highly photocurable even by being irradiated with ultraviolet light at low light intensity; hence, the ink can be easily handled and exhibit high ejection stability, and an image which is highly curable even at low light intensity can be formed.

The active-energy-ray-curable inkjet recording ink composition of the present invention is highly adhesive to plastic materials. Hence, the ink composition enables easy printing even on a surface of a plastic product or another product having an irregular shape such as a curved surface or an uneven shape. Specific examples thereof include materials generally used as plastic materials for injection molding, such as ABS-based polymer alloys, e.g., an ABS (acrylonitrile-butadiene-styrene) resin, a PVC (polyvinyl chloride)/ABS resin, a PA (polyamide)/ABS resin, a PC (polycarbonate)/ABS resin, and a PBT (polybutylene terephthalate)/ABS; and an ABS (acrylonitrile-acrylic rubber-styrene) resin, an AS (acrylonitrile-styrene) resin, an AES (acrylonitrile-ethylene rubber-styrene) resin, an MS ((meth)acrylate-styrene)-based resin, a PC (polycarbonate)-based resin, an acrylic resin, a methacrylic resin, and a PP (polypropylene)-based resin.

Films formed of plastic materials, such as thermoplastic resin films used as packaging materials, can be employed as a recording medium. Examples of the thermoplastic resin films used for food packaging include polyolefin films such as polyethylene terephthalate (PET) films, polystyrene films, polyamide films, polyacrylonitrile films, polyethylene films (LLDPE: low-density polyethylene film and HDPE: high-density polyethylene film), and polypropylene films (CPP: castpolypropylene film and OPP: oriented polypropylene film); and polyvinyl alcohol films and ethylene-vinyl alcohol copolymer films. These films may be uniaxially or biaxially stretched. Furthermore, the surface of the film may be optionally subjected to a variety of surface treatments such as a flame treatment and a corona discharge treatment.

The active-energy-ray-curable inkjet recording ink composition of the present invention particularly exhibits good adhesion to acrylic and methacrylic resins.

EXAMPLES

Although the present invention will now be described further in detail with reference to Examples, the present invention should not be limited thereto. In Examples, the term "part" is on a mass basis.

Example of Preparation of High-Concentrated Pigment Dispersion Liquid (Millbase)

Example of Production of Millbase (1)

The following components were mixed with each other by being stirred for an hour with a stirrer and then dispersed for two hours with a bead mill to produce a millbase (1).

| | |
|---|---|
| Fastogen blueTGR-G<br>Phthalocyanine pigment C. I. Pigment Blue 15:4,<br>manufactured by DIC Corporation | 10 parts |
| Solsperse32000<br>Polymer pigment dispersant, manufactured by The<br>Lubrizol Corporation | 4.5 parts |
| LIGHT ACRYLATEPO-A<br>Phenoxy ethyl acrylate (monofunctional monomer),<br>manufactured by kyoeisha Chemical Co., Ltd. | 85.5 parts |

Example of Production of Millbase (2)

The following components were mixed with each other by being stirred for an hour with a stirrer and then dispersed for two hours with a bead mill to produce a millbase (2)

| | |
|---|---|
| LEVASCREEN Yellow G01<br>C. I. Pigment Yellow 150, manufactured by LANXESS | 10 parts |
| Solsperse32000<br>Polymer pigment dispersant, manufactured by The<br>Lubrizol Corporation | 6 parts |
| LIGHT ACRYLATEPO-A<br>Phenoxy ethyl acrylate (monofunctional monomer),<br>manufactured by kyoeisha Chemical Co., Ltd. | 84 parts |

Examples 1 to 6 Method for Producing Active-Energy-Ray-Curable Inkjet Recording Ink Composition Active-energy-ray-curable inkjet recording ink compositions were produced as shown in Table 1. In particular, photopolymerization initiators including 5 parts of Irgacure 819 (manufactured by BASF SE), 5 parts of Lucirin TPO (manufactured by BASF SE), and 2 parts of Irgacure 907 (manufactured by BASF SE); a sensitizer that was 2 parts of DETX-S (diethylthioxanthone, manufactured by Nippon Kayeku Co., Ltd.); a regulator of surface tension that was 0.4 parts of KF-615 (polyether-modified silicone oil, manufactured by Shin-Etsu Silicone); and a polymerization inhibitor that was 0.05 parts of Irgastab (UV-10) (manufactured by BASF SE) were added to a mixture of a monofunctional monomer and a polyfunctional monomer, and the product was stirred for 30 minutes while being heated at 60° C. The millbase prepared as described above was added thereto, and the components were thoroughly mixed. Then, the product was filtered through a filter having a pore size of 1.2 μm to produce each of active-energy-ray-curable inkjet recording ink compositions (1) to (6).

Comparison Examples 1 to 6 Method for Producing Active-Energy-Ray-Curable Inkjet Recording Ink Composition Comparative active-energy-ray-curable inkjet recording ink compositions (H1) to (H6) were produced as in Example 1 except that components shown in Table 2 were used.

Measurement of Physical Properties

The surface tension and viscosity of the active-energy-ray-curable inkjet recording ink compositions (1) to (6) and (H1) to (H6) were measured as the physical properties thereof. The measurement was carried out as follow.

Surface Tension

The surface tension was measured with a Wilhelmy-type surface tensiometer: CBUP-A3 manufactured by Kyowa Interface Science Co., Ltd. An ink composition was put into a plastic container, and the plastic container was immersed into a constant temperature water bath to preliminarily adjust the temperature of the ink composition to be 25° C. for measurement of the surface tension at 25° C.

Viscosity

The viscosity at 25° C. was measured with a viscometer: TVE-20L manufactured by TOKI SANGYO CO., LTD. A rotational rate during the measurement was 20 rpm/mim. In order to carry out stable printing with an evaluative inkjet printer used in Examples of the present invention, the viscosity of each of the in compositions was adjusted to be between 14 to 16 mPa·sec.

TABLE 1

| | | | | Example 1 | Example 2 | Example 3 | Example 4 | Example 5 | Example 6 |
|---|---|---|---|---|---|---|---|---|---|
| | Millbase | | | (1)<br>20 | (1)<br>20 | (1)<br>20 | (1)<br>20 | (1)<br>20 | (2)<br>30 |
| Polymerizable<br>monomer | Polyfunctional<br>monomer | | VEEA | 8 | 8 | 8 | 8 | 14 | 8 |
| | | | M222 | 4 | 4 | 4 | 4 | 15 | 2 |
| | Monofunctional<br>monomer | | IBXA | 20 | 10 | 5 | 10 | 10 | 10 |
| | | | V-CAP | 15 | 15 | 15 | 5 | 15 | 15 |
| | | | POA | 38 | 43 | 48 | 53 | 26 | 35 |
| | Mass % of<br>monofunctional<br>monomer | | | 87.6 | 87.6 | 87.6 | 87.6 | 70.1 | 89.5 |
| Viscosity at 25° C. mPa · sec | | | | 14.13 | 14.43 | 14.54 | 14.48 | 14.48 | 14.25 |
| Surface tension mN/m | | | | 28.5 | 28.6 | 28.7 | 28.8 | 28.9 | 28.9 |

TABLE 2

| | | | | Comparative<br>Example 1 | Comparative<br>Example 2 | Comparative<br>Example 3 | Comparative<br>Example 4 | Comparative<br>Example 5 | Comparative<br>Example 6 |
|---|---|---|---|---|---|---|---|---|---|
| | Millbase | | | (1)<br>20 | (1)<br>20 | (1)<br>20 | (1)<br>20 | (1)<br>20 | (1)<br>20 |
| Polymerizable<br>monomer | Bifunctional<br>monomer | | VEEA | 8 | 8 | 8 | 8 | | 15 |
| | | | M222 | 4 | 4 | 4 | 4 | 12 | 27 |

TABLE 2-continued

|  |  | Comparative Example 1 | Comparative Example 2 | Comparative Example 3 | Comparative Example 4 | Comparative Example 5 | Comparative Example 6 |
|---|---|---|---|---|---|---|---|
| Monofunctional monomer | IBXA | 30 | 0 | 10 | 10 | 10 | 10 |
|  | V-CAP | 15 | 15 | 20 | 0 | 15 | 15 |
|  | POA | 23 | 53 | 38 | 58 | 43 | 13 |
| Mass % of monofunctional monomer |  | 87.6 | 87.6 | 87.6 | 87.6 | 87.6 | 56.7 |
| Viscosity at 25° C. |  | 14.01 | 14.66 | 14.5 | 14.52 | 15.23 | 14.26 |
| Surface tension mN/m |  | 28.4 | 28.7 | 28.7 | 28.4 | 28.7 | 28.9 |

The abbreviations in Tables 1 and 2 are as follows:

VEEA: 2-(2-vinyloxyethoxy)ethyl acrylate, manufactured by NIPPON SHOKUBAI CO., LTD.

M222: dipropylene glycol diacrylate, manufactured by Miwon Specialty Chemical Co., Ltd.

IBXA: isobornyl acrylate, manufactured by Osaka Organic Chemical industry Ltd.

V-CAP: N-vinylcaprolactam, manufactured by ISP Investments Inc.

POA: phenoxy ethyl acrylate, manufactured by kyoeisha Chemical Co., Ltd.

Evaluation of Ink

The characteristics of printed films of the active-energy-ray-curable inkjet recording ink compositions (1) to (6) and (H1) to (H6) were evaluated as follows.

Printing on Substrate

An active-energy-ray-curable inkjet recording ink composition produced in Examples or Comparative Examples was supplied to an evaluative inkjet printer including a shear-mode piezoelectric inkjet head, and printing was carried out such that a film having an intended thickness was formed on a target substrate.

Active-Energy-Ray (LED) Curability

An active-energy-ray-curable inkjet recording ink composition formed in Examples or Comparative Examples was applied to a polycarbonate plate (thickness: 1 mm) in the above-mentioned manner of printing such that a film having a thickness of 2 μm was formed. Then, the product was irradiated with light at an energy of 50 J/m² per irradiation with LED irradiation equipment having a stage-moving mechanism and manufactured by Hamamatsu Photonics K.K. (emission wavelength: 385 nm, peak intensity: 500 mW/cm²). The integrated quantity of the energy of light radiated until a tack-free state had been achieved was determined.
In order to satisfy the conditions for practical printing with an LED-curing printer, the ink preferably had a sensitivity which enabled curing at the integrated quantity of light of 200 mJ/cm².

Storage Stability

An active-energy-ray-curable inkjet recording ink composition produced in Examples or Comparative Examples was put into a plastic container and statically stored in a thermostatic chamber at 60° C. for 4 weeks. The viscosity of the ink before the stationary storage was compared with the viscosity of the ink after the stationary storage, and the rate of the viscosity change was obtained from the following formula. The viscosity was measured as in the above-mentioned measurement of viscosity as a physical property.

Rate of viscosity change(%)=viscosity of ink after stationary storage/viscosity of ink before stationary storage×100(%)  [Math. 1]

The rate of viscosity change of up to and including 10% did not have an adverse effect on election properties of ink; hence, in view of proper ink ejection from the inkjet head, an ink composition which satisfied this requirement was determined as being excellent.

Solvent Resistance

An active-energy-ray-curable inkjet recording ink composition produced in Examples or Comparative Examples was applied to a white PET sheet (trade name: Lumirror-250-522, manufactured by PANAC CO., LTD.) in the above-mentioned manner of printing such that a film having a thickness of approximately 6 μm was formed. Then, the coating film was irradiated with ultraviolet light with LED irradiation equipment having a stage-moving mechanism and manufactured by Hamamatsu Photonics K.K. emission wavelength: 385 nm, peak intensity: 500 mW/cm²) until the surface of the coating film entered a tack-free state, thereby producing a sample used for testing solvent resistance.

The sample was left to stand at room temperature for 24 hours. Then, the surface of the coating film was rubbed in a lateral direction with a swab containing ethanol, and the number of times of the rubbing necessary to completely remove the coating film was determined. In this case, the upper limit of the number of times was 100 times.

In view of solvent resistance which a printed article needs to have, a sample in which the coating had been completely removed by 70 or more times of the rubbing was determined as being excellent.

Adhesion

Test by Peeling of Cross-Cut Tape

An active-energy-ray-curable inkjet recording ink composition produced in Examples or Comparative Examples was applied to the following plastic substrates in the above mentioned manner of printing such that a film having a thickness of approximately 6 μm was formed. Then, the coating film was irradiated with light with LED irradiation equipment having a stage-moving mechanism and manufactured by Hamamatsu Photonics K.K. emission wavelength: 385 nm, peak intensity: 500 mW/cm²) until the surface of the coating film entered a tack-free state, thereby producing a plate used for evaluating adhesion.

The cured coating film of the plate used for evaluating adhesion was cut with a knife to form 100 squares of a 10×10 grid, an adhesive cellophane tape manufactured by Nichiban Co., Ltd. was attached thereto, and the product was scratched approximately 10 times with a nail. Then, the adhesive cellophane tape was swiftly removed at a removal rate of approximately 1 cm/sec, and the number of squares remaining on the coating film was observed.

A case in which the number of the remaining squares was 50 or more was determined as being excellent.

The following plastic substrates were used:

Printing substrates

Acryl: Acrylic plate (ACRYLITE L manufactured by Mitsubishi Rayon Co., Ltd.)

Printing substrates

PC: Polycarbonate plate (LEXAN manufactured by ASAHI GLASS CO., LTD.)
PVC: Rigid polyvinyl chlorideplate (HISHI PLATE GE301 manufactured by Mitsubishi Plastics, Inc.)
PET: Easy-adhesion PET plate (COSMOSHINEA4100 manufactured by TOYOBO CO., LTD.)
PP: YUPO synthetic paper (FPU250 manufactured by Yupo Corporation)
ABS: ABS plate (HISHI PLATE Y-268 manufactured by Mitsubishi Plastics, Inc.)

TABLE 3

| | | | Example 1 | Example 2 | Example 3 | Example 4 | Example 5 | Example 6 |
|---|---|---|---|---|---|---|---|---|
| | Millbase | | (1) | (1) | (1) | (1) | (1) | (2) |
| | | | 20 | 20 | 20 | 20 | 20 | 30 |
| Polymerizable monomer | Polyfunctional monomer | VEEA | 8 | 8 | 8 | 8 | 14 | 8 |
| | | M222 | 4 | 4 | 4 | 4 | 15 | 2 |
| | Monofunctional monomer | IBXA | 20 | 10 | 5 | 10 | 10 | 10 |
| | | V-CAP | 15 | 15 | 15 | 5 | 15 | 15 |
| | | POA | 38 | 43 | 48 | 53 | 30 | 35 |
| | Mass % of monofunctional monomer | | 87.6 | 87.6 | 87.6 | 87.6 | 70.1 | 89.5 |
| Results of evaluations of physical properties | LED curability J/m$^2$ | | 100 | 100 | 100 | 150 | 50 | 100 |
| | Storage stability (rate of viscosity change %) | | 2.4 | 3.6 | 6.8 | 0.5 | 2.8 | 3.2 |
| | Solvent resistance (number of times) | | 90 | 100 | >100 | 90 | >100 | 100 |
| | Adhesion n/100 | Acryl | 100 | 100 | 100 | 100 | 70 | 100 |
| | | PC | 80 | 90 | 100 | 100 | 90 | 100 |
| | | PVC | 100 | 100 | 100 | 90 | 100 | 100 |
| | | PET | 100 | 100 | 100 | 100 | 100 | 100 |
| | | PP | 80 | 80 | 80 | 80 | 70 | 80 |
| | | ABS | 100 | 100 | 100 | 100 | 100 | 100 |

TABLE 4

| | | | Comparative Example 1 | Comparative Example 2 | Comparative Example 3 | Comparative Example 4 | Comparative Example 5 | Comparative Example 6 |
|---|---|---|---|---|---|---|---|---|
| | Millbase | | (1) | (1) | (1) | (1) | (1) | (1) |
| | | | 20 | 20 | 20 | 20 | 20 | 20 |
| Polymerizable monomer | Polyfunctional monomer | VEEA | 8 | 8 | 8 | 8 | 0 | 15 |
| | | M222 | 4 | 4 | 4 | 4 | 12 | 27 |
| | Monofunctional monomer | IBXA | 30 | 0 | 10 | 10 | 10 | 10 |
| | | V-CAP | 15 | 15 | 20 | 0 | 15 | 15 |
| | | POA | 23 | 53 | 38 | 58 | 43 | 13 |
| | Mass % of monofunctional monomer | | 87.6 | 87.6 | 87.6 | 87.6 | 87.6 | 56.7 |
| Results of evaluations of physical properties | LED curability J/m$^2$ | | 100 | 100 | 50 | 250 | 150 | 100 |
| | Storage stability (rate of viscosity change %) | | 2.4 | 5.3 | 18.8 | 0.5 | 5.6 | 5.3 |
| | Solvent resistance (number of times) | | 25 | 45 | 100 | 45 | 45 | 45 |
| | Adhesion n/100 | Acryl | 100 | 50 | 70 | 50 | 0 | 20 |
| | | PC | 100 | 100 | 100 | 60 | 40 | 40 |
| | | PVC | 100 | 100 | 100 | 50 | 50 | 50 |
| | | PET | 100 | 100 | 100 | 60 | 60 | 50 |
| | | PP | 80 | 70 | 90 | 30 | 0 | 0 |
| | | ABS | 100 | 100 | 100 | 80 | 80 | 55 |

Effect of Isobornyl Acrylate Content

The results of the evaluations in Examples 1 to 3 and Comparative Examples 1 and 2 show that good solvent resistance was exhibited in each of Examples 1 and 3 in which the isobornyl acrylate content was in the range of 1 to 25 mass % and that the solvent resistance was poor in Comparative Example 1 in which the isobornyl acrylate content was excessive and in Comparative Example 2 in which isobornyl acrylate was not used. These results show that the isobornyl acrylate content ranging from 1 to 25 mass enabled production of a coating film having an excellent solvent resistance.

Effect of N-Vinylcaprolactam Content

The results of the evaluations in Examples 2 and 4 and Comparative Examples 3 and 4 show that the N-vinylcaprolactam content of 5 mass % greatly enhanced adhesion to plastic substrates (from comparison of Example 4 with Comparative Example 4). In Comparative Example 3 in which the N-vinylcaprolactam content was greater than 20 mass %, the rate of viscosity change increased, which shows that the ink composition was inappropriate for being used for inkjet inks.

Effect of Polymerizable Compound Having Vinyl Ether Group

The results of the evaluations in Example 2 and Comparative Example 5 show that use of 2-(2-vinyloxyethoxy)ethyl acrylate as the polymerizable compound having a vinyl ether group greatly enhanced adhesion to plastic substrates.

Effect of Monofunctional Monomer Content

The results of the evaluations in Examples 2 and 5 and Comparative Example 6 show that adhesion to the plastic materials was poor in the case where the mass % of the monofunctional monomer was less than 60 mass % relative to the total amount of the active-energy-ray-polymerizable compound. These results show that the mass % of the monofunctional monomer needed to be 60 mass % or more relative to the total amount of the active-energy-ray-polymerizable compound.

The invention claimed is:

1. An active-energy-ray-curable inkjet recording ink composition comprising an active-energy-ray-polymerizable compound and a photopolymerization initiator, wherein
   (1) a polymerizable compound having an active-energy-ray-polymerizable group and a polymerizable compound having at least two active-energy-ray-polymerizable groups are used in amounts of 60 to 95 mass % and 5 to 40 mass % relative to the total amount of the active-energy-ray-polymerizable compound, respectively;
   (2) the polymerizable compound having an active-energy-ray-polymerizable group includes N-vinylcaprolactam and isobornyl acrylate in amounts of 1 to 15 mass % and 1 to 25 mass % relative to the total amount of the active-energy-ray-polymerizable compound, respectively;
   (3) the polymerizable compound having at least two active-energy-ray-polymerizable groups includes a polymerizable compound having a vinyl ether group;
   (4) the polymerizable compound having the vinyl ether group is 2-(2-vinyloxyethoxy)ethyl (meth)acrylate; and
   (5) the photopolymerization initiator comprises only a radically polymerizable photopolymerization initiator.

2. The active-energy-ray-curable inkjet recording ink composition according to claim 1, further comprising a pigment that serves as a colorant.

3. A method for forming an image, the method comprising ejecting an active-energy-ray-curable inkjet recording ink composition to a recording medium to print an image and irradiating the image with an active energy ray having the peak wavelength ranging from 365 to 420 nm with a light-emitting diode to cure the image, wherein the active-energy-ray-curable inkjet recording ink composition is the ink composition according to claim 1.

4. The method according to claim 3, wherein the recording medium is a plastic material.

5. The active-energy-ray-curable inkjet recording ink composition according to claim 1, wherein the radically polymerizable photopolymerization initiator comprises an initiator selected from the group consisting of benzoin isobutyl ether, 2,4-diethylthioxanthone, 2-isopropylthioxanthone, benzyl, 2,4,6-trimethylbenzoyldiphenylphosphine oxide-6-trimethylbenzoyldiphenylphosphine oxide, 2-benzyl-2-dimethylamino-1-(4-morpholinophenyl)-butan-1-one, and bis(2,6-dimethoxybenzoyl)-2,4,4-trimethylpentyl phosphine oxide.

* * * * *